Patented Dec. 14, 1943

2,336,853

UNITED STATES PATENT OFFICE 2,336,853

ASYMMETRIC ARSENOBENZENE

Alfred Fehrle, Bad Soden in Taunus, and Hubert Oesterlin, Walter Herrmann, and Friedrich Hampe, Frankfort-on-the-Main, Germany, assignors to Winthrop Chemical Company, Inc., New York, N. Y., a corporation of New York No Drawing. Application October 3, 1940, Serial No. 359,554. In Germany October 6, 1939

5 Claims. (Cl. 260—445)

The present invention relates to asymmetric arsenobenzenes.

Asymmetric arsenophenoxy-acetic acids containing a primary amino group are already known; these compounds, however, are of no therapeutical importance. On the other hand, a series of arsenophenoxy-acetic acid compounds which do not contain a primary amino group have become known which are of great value in the modern therapeutic art.

Now, we have found that asymmetric arsenophenoxy-acetic acid compounds which contain a urea radical, i. e. the group —NH—CO—NH$_2$, are distinguished over the known compounds by a much better action against spirochaetes and especially against trypanosomes. The aqueous solutions of the salts of the new compounds are distinguished by the fact that, when stored with exclusion of air, they keep their toxicity and therapeutic value for an unlimited space of time.

The new compounds may be prepared in known manner by transforming phenoxy-acetic acid-arsonic acids, or the derivatives thereof containing trivalent arsenic, together with other arylarsonic acids containing a carbamino group or the derivative thereof containing trivalent arsenic into the corresponding arsenobenzenes or by causing symmetric arsenophenoxy-acetic acids to react with symmetric carbaminoarsenobenzenes; it is also possible to cause asymmetric arsenobenzenes containing a hydroxy-acetic acid radical and a primary or secondary amino group bound to a benzene nucleus to react with alkalicyanates.

The products have the following general formula:

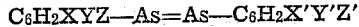

in which
X is —OH
Y and Y' are either —CH$_3$ or H
Z represents the substituent —NH.CO—NH$_2$, which substituent is in either the 3-position or the 4-position with respect to the arseno group,
X' is —NHCOCH$_3$ and
Z' represents the group —O—CH$_2$COOM, M being hydrogen, an alkali metal, NH$_4$, or an aliphatic organic ammonium radical.

The products are yellow powders which easily dissolve in alkalies and which, on being heated, char without melting. They may be transformed by alkali carbonates, such as potassium and sodium carbonate, as well as by organic bases and ammonia into salts which are soluble in water with a neutral reaction and, on being heated, likewise char without melting.

For the purposes of the present invention we may employ a suitable organic nitrogen base such as ethanolamine, diethanolamine, methylamine, dimethylamine, ethylamine, diethylamine and methylglucamine.

The following examples illustrate the invention:

(1) 27.6 grams of 3-hydroxy-4-carbaminobenzene-1-arsonic acid and 33.3 grams of 4-acetylaminobenzene-2-hydroxy-acetic acid-1-arsonic acid are dissolved, while heating, in 500 cc. of alcohol by addition of alcoholic hydrochloric acid. The solution is reduced by means of 80 cc. of hypophosphorous acid of 50% strength and 10 grams of potassium iodide at 60° C.–65° C. The arsenobenzene obtained is precipitated by pouring it into water; it is transformed into its sodium salt by dissolving it in sodium carbonate solution and precipitating it with alcohol and ether.

The product has the formula:

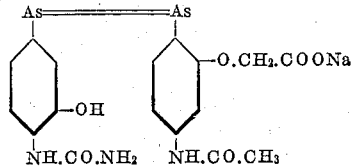

The yield amounts to 43 grams.

(2) 27.6 grams of 3-hydroxy-4-carbaminobenzene-1-arsonic acid and 33.3 grams of 3-acetylaminobenzene-4-hydroxyacetic acid-1-arsonic acid are dissolved in 175 cc. of 2-N caustic soda solution and 1000 cc. of water and reduced by means of 300 grams of sodium hydrosulfite. The arseno compound which has been separated is rubbed on with methyl alcohol, dissolved by addition of hot water and precipitated by introducing it, while stirring, into acetone or into alcohol and ether.

The product has the formula:

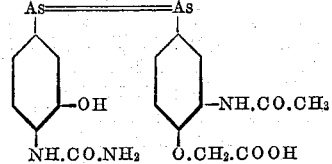

The yield amounts to 36 grams.

(3) 27.6 grams of 3-carbamino-4-hydroxybenzene-1-arsonic acid and 33.3 grams of 4-acetylaminobenzene-2-hydroxy-acetic acid-1-arsonic acid are mixed, introduced into 420 cc. of glacial acetic acid with addition of 50 grams of sodium acetate and reduced at about 75° C. by means of 80 cc. of hypophosphorous acid of 50% strength and 30 grams of potassium iodide. The arsenobenzenic acid formed is separated by pouring it into water and transformed into its sodium salt as described in Example 1.

The product has the following formula:

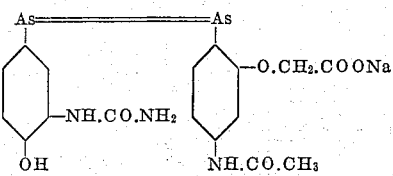

The yield amounts to 41 grams.

(4) 27.6 grams of 3-carbamino-4-hydroxybenzene-1-arsonic acid and 33.3 grams of 3-acetylaminobenzene-4-hydroxyacetic acid-1-arsonic acid are reduced in glacial acetic acid by means of hypophosphorous acid in the presence of sodium acetate and potassium iodide as described in Example 3 and transformed into the sodium salt.

The product obtained has the formula:

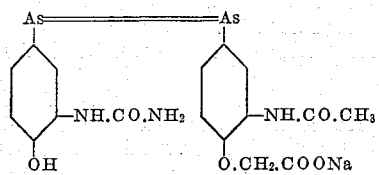

The yield amounts to 43 grams.

(5) 27.6 grams of 2-hydroxy-5-carbaminobenzene-1-arsonic acid and 33.3 grams of 4-acetylaminobenzene-2-hydroxy acetic acid-1-arsonic acid or the same amount of 3-acetylaminobenzene-4-hydroxyacetic acid 1-arsonic acid may be reduced as indicated in Example 1 or 3 by means of hypophosphorous acid and potassium iodide. The sodium salts of these compounds may also be prepared as indicated in the preceding examples. The products have the formulae:

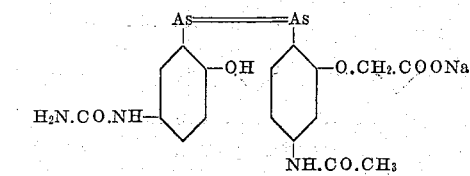

and

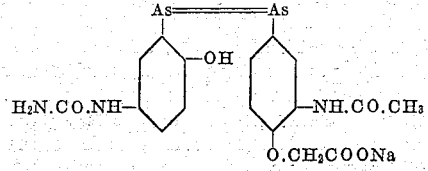

The yields amount to 39 and 35 grams, respectively.

In a similar manner further arsenobenzenes may be obtained by using for the reduction as carbamino compound 26 grams of 4-carbaminobenzene-1-arsonic acid or 27.4 grams of 3-carbamino-4-methylbenzene-1-arsonic acid and as phenoxy acetic acid 29 grams of 2-methylbenzene-4-hydroxy acetic acid-1-arsonic acid.

(6) 14 grams of 4.4'-diacetyldiaminoarsenobenzene-3.3'-dihydroxy acetic acid and 10.1 grams of 3.3' - dihydroxy - 4.4' - di - (carbamino) -arsenobenzene are dissolved in 100 cc. of water with caustic soda solution. The solution is heated to 40° C.–50° C., with exclusion of air until a test portion precipitated by means of hydrochloric acid is soluble in sodium bicarbonate solution to a clear solution. The whole is diluted with the equal amount of methyl alcohol, neutralized with acetic acid and the product is precipitated by introduction, while stirring, into alcohol and ether.

The product has the formula:

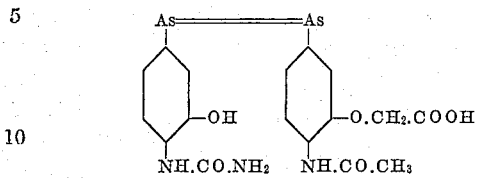

The yield amounts to 18 grams.

(7) 15 grams of 5-acetylaminobenzene-2-hydroxyacetic acid-1-arsine oxide are dissolved in 150 cc. of water and the quantity of caustic soda solution necessary for effecting solution. An alkaline solution of 11 grams of 3-hydroxy-4-carbaminobenzene-1-arsine—prepared by reduction of 3-hydroxy-4-carbaminobenzene-1-arsonic acid with zinc dust—is added. The whole is heated for a short time on the steam bath and the asymmetric arsenobenzene is precipitated by acidification and transformed as described in the preceding examples. The same arsenobenzene may, of course, also be obtained by direct reduction of the corresponding arsonic acids.

The product has the formula:

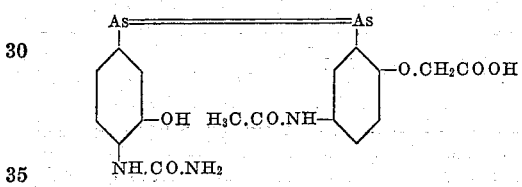

The yield amounts to 20 grams.

(8) 23.3 grams of 3-amino-4-hydroxybenzene-1-arsonic acid and 33.3 grams of 3-acetylaminobenzene-4-hydroxyacetic acid-1-arsonic-acid are reduced, preferably in a way similar to that of Example 3, in acetic acid by means of hypophosphorous acid with formation of arseno benzene. The acetic acid solution, containing the corresponding amount of arseno-benzene resulting from the arsonic acids used, is cooled to 15° C. and, while stirring, an aqueous solution of 20 grams of potassium cyanate in 30 cc. of water is added, drop by drop. When the reaction is finished, the reaction mixture is poured into water and filtered with suction. The arsenobenzene thus obtained is, upon transformation to the sodium salt, identical with that obtained according to Example 4.

The yield amounts to 32 grams.

We claim:

1. A water-soluble salt of an asymmetric arsenobenzene having the following formula:

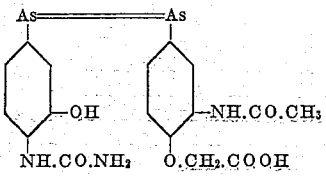

said salt being effective against trypanosomes and spirochaetes.

2. A water-soluble salt of an asymmetric arsenobenzene having the following formula:

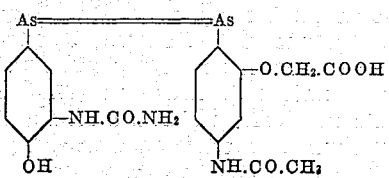

said salt being effective against trypanosomes and spirochaetes.

3. A water-soluble salt of an asymmetric arsenobenzene having the following formula:

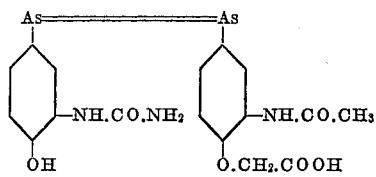

said salt being effective against trypanosomes and spirochaetes.

4. An asymmetric arsenobenzene having the formula $$C_6H_2XYZ—As=As—C_6H_2X'Y'Z'$$

where X is —OH, Y and Y' are members of the class consisting of —CH_3 and H, Z is the substituent —NH.CO.NH_2, said substituent NHCONH_2 occupying one of the positions 3 and 4 with respect to the arseno group, X' is —NHCOCH_3 and Z' is the group —O—CH_2COOM, M being a member of the class consisting of H, alkali metals, NH_4, and aliphatic organic ammonium radicals, said asymmetric arsenobenzene being effective against trypanosomes and spirochaetes.

5. A water-soluble salt of an asymmetric arsenobenzene having the formula $$C_6H_3(OH)(NHCONH_2)—As=$$
$$As—C_6H_3(NHCOCH_3)(OCH_2COOH)$$

in which the substituent NHCONH_2 occupies a position with respect to the arseno group which is selected from the group consisting of the 3- and 4-positions, said salt being effective against trypanosomes and spirochaetes.

ALFRED FEHRLE.
HUBERT OESTERLIN.
WALTER HERRMANN.
FRIEDRICH HAMPE.